United States Patent

Young

(10) Patent No.: US 9,151,846 B2
(45) Date of Patent: Oct. 6, 2015

(54) SIGNAL PROCESSOR AND SIGNAL PROCESSING METHOD

(75) Inventor: Phil Young, Northampton (GB)

(73) Assignee: QUALCOMM Incorporated, San Diego, CA (US)

( * ) Notice: Subject to any disclaimer, the term of this patent is extended or adjusted under 35 U.S.C. 154(b) by 1719 days.

(21) Appl. No.: 11/918,259

(22) PCT Filed: Dec. 14, 2006

(86) PCT No.: PCT/EP2006/069733
§ 371 (c)(1),
(2), (4) Date: Oct. 11, 2007

(87) PCT Pub. No.: WO2007/068746
PCT Pub. Date: Jun. 21, 2007

(65) Prior Publication Data
US 2009/0021428 A1    Jan. 22, 2009

(30) Foreign Application Priority Data

Dec. 16, 2005    (EP) .................................... 05112300

(51) Int. Cl.
| G06F 12/00 | (2006.01) |
| G01S 19/37 | (2010.01) |
| G01S 19/24 | (2010.01) |
| G01S 19/34 | (2010.01) |

(52) U.S. Cl.
CPC ............... *G01S 19/37* (2013.01); *G01S 19/24* (2013.01); *G01S 19/34* (2013.01); *Y10T 29/49002* (2015.01)

(58) Field of Classification Search
CPC ......... G01S 19/37; G01S 19/24; G01S 19/34; Y10T 29/49002
USPC ...................................... 711/106; 342/357.21
See application file for complete search history.

(56) References Cited

U.S. PATENT DOCUMENTS

| 5,379,224 A | 1/1995 | Brown et al. |
| 5,781,156 A | 7/1998 | Krasner |
| 6,118,808 A | 9/2000 | Tiemann et al. |
| 2009/0167594 A1 | 7/2009 | Young |

FOREIGN PATENT DOCUMENTS

| DE | 4114058 | 11/1992 |
| EP | 1 198 068 A1 | 4/2002 |
| JP | 5256927 A | 10/1993 |
| JP | 2001189681 A | 7/2001 |
| WO | WO 2005/003807 A1 | 1/2005 |

OTHER PUBLICATIONS

N. Tan et al., "A Power-Saving Technique for Bit-Serial DSP ASICs,", ISCAS '94 IEEE International Symposium on Circuits and Systems, vol. 4, May 30, 1994, pp. 51-54.
International Search Report and Written Opinion—PCT/EP2006/069733—ISA/EPO—May 7, 2007.

*Primary Examiner* — Matthew Bradley
(74) *Attorney, Agent, or Firm* — Linda G. Gunderson

(57) ABSTRACT

Signal processor for a GNSS receiver, in particular a GPS receiver, characterized by the use of un-refreshed volatile dynamic memory as a storage element for real-time digital data. The invention takes advantage from the fact that many memory units are used to store real-time data and are constantly overwritten at a rate which can conveniently be shorter than a mean retention time of a DRAM cell. Moreover several memories are used to store noise-dominated data which are then statistically analyzed in a way that can tolerate a small rate of retention errors. Thus the automatic refresh circuitry can be disposed of without adverse effect.

15 Claims, 4 Drawing Sheets

SIGNAL PROCESSOR AND SIGNAL PROCESSING METHOD

REFERENCE DATA

This application is a national stage of international application PCT/EP2006/069733, filed Dec. 14, 2006, which claims priority of European patent application EP05112300 filed Dec. 16, 2005 the contents of which are hereby incorporated by reference.

FIELD OF THE INVENTION

The present invention concerns a satellite radiolocalization receiver and in particular, but not exclusively, a radiolocalization receiver adapted to receive and process radiolocalization signals generated by a constellation of geo-localization satellite, like for example the satellites of the GPS, GLONASS or Galileo System or other global navigation satellite systems (GNSS). The present invention also concerns a signal processor unit adapted for treating radiolocalization signals provided by a suitable RF interface, and which can be embedded in a dedicated GNSS apparatus or in another host system, like for example a general-purpose computer, PDA or cell phone.

DESCRIPTION OF RELATED ART

The Global Navigation Satellite Systems (GNSS) generically include the General Positioning System (GPS), operated by the United States, the Global Orbiting Navigation Satellite System (GLONASS) operated by the Russian Federation and the projected Galileo positioning system, to be built by the European Union.

The following description and examples will often refer, for the sake of simplicity, to a GPS receiver only. It will be understood, however, that he present invention is not necessarily restricted to such a receiver, but includes also all GNSS sources, and can be extended to other future radiolocalization systems to which the invention is applicable.

GNSS radio signals are located in the portion of the radio spectrum above 1 GHz, have power level, at ground, of the order of −120 dBm or less and are generally direct-sequence spread-spectrum signals modulated by pseudo-random code binary sequences, which are used in the receiver for positioning and navigation. The general functioning of a satellite radiolocalization devices are well known and will be resumed briefly in the description. Reference is also made to patent applications EP 1198068 and WO05003807 in the name of the applicant.

Satellite radiolocalization systems, such as GPS (Global Positioning System), GLONASS or Galileo rely on the reception of radio signals broadcast from a number of orbiting satellites and use the information contained in these signals to determine the distances, or ranges, from the receiver to each of the received satellites. The orbits of the satellites being known, absolute time and the location of the GPS receiver can then be determined geometrically.

In the context of the present invention the terms "receiver" and "GPS receiver" can designate a complete self-contained receiver device, but also a module, included in a complex entity, for example a GPS module in a cellular phone, a car alarm, a PDA (Portable Digital Assistant) and so forth. The terms above may also indicate a pluggable module, which may be connected with a hosting device by means of an appropriate bus, for example a GPS PC-card.

The terms "receiver" and "GPS receiver" should also be understood, in the context of the present invention, as including one of more integrated circuits, arranged to realize a complete GPS receiver or a complete GPS module, as defined above.

The following description relates mostly to the GPS Global Positioning System. The invention is not however limited to this particular system but can also be employed in receivers for radiolocalization systems based on the same principles, for example the GLONASS system or the GALILEO system.

In the case of the original GPS radiolocalization system, each of the operational GPS satellites, also indicated as Space Vehicle or SV, transmits a navigational radio signal at two carrier frequencies, referenced as "L1" and "L2" and situated at 1572.42 MHz and 1227.60 MHz respectively. The L1 and L2 carriers are modulated by two digital ranging code sequences, called the C/A (coarse acquisition) code and the P(Y) code, the latter being mostly restricted to the US government and military.

The C/A code, which is used by commercial GPS receiver, is modulated in the L1 and in the L2 carriers. C/A codes, which are unique for each GPS satellite, are pseudo-random Gold codes comprising a repetition of a 1023 bits, or "chips", with a transition rate of 1.023 MHz, and are often indicated in short as PRN. The C/A code thus repeats itself every millisecond. The ranging code sequences are synchronized to a common precise time reference, the "GPS time" which is held by precise clocks on board of each satellite, and which are synchronized to a master clock. The effect of the PSK modulation with the C/A code is to spread the spectrum of the modulated signal over a 1 MHz bandwidth.

Other radiolocalization systems, for example the proposed Galileo system and proposed extensions to the GPS system, also employ similar or equivalent signal structures, based on ranging codes synchronized to a common standard of absolute time.

Both L1 and L2 carriers further carry a 50 bps navigation message, the NAV code. The navigation message contains, along with other information, the coordinates of the GPS satellites as a function of time, clock corrections, and atmospheric data. The NAV message is encoded by inverting the logical value of the C/A code whenever the NAV bit is "1", and leaving it unaltered otherwise.

The signal strength of the GPS signals on earth surface is, nominally, −130 dBmW, a value which is further attenuated whenever the view of the sky is obstructed, and especially within buildings. Other satellite navigation systems provide signals of comparable strength. Such levels are well below the noise floor, thus the signal can be received only by use of statistical techniques.

In order to acquire these codes and perform a position fix a GPS receiver generates, for each received satellite, a local replica of the C/A code, the PN code, adjusted to a local NCO running at a frequency close to 1.023 MHz. The code is then time-shifted, correlated with the received signal in a correlation engine of the receiver, and integrated, for a time that can be more or less long according to the noise level, until a peak of correlation value is obtained for a certain value of time-shift, that depends from the distance between the receiver and the satellite.

The amount of time-shift needed to achieve optimal correlation, or pseudo-range, is an indication of the distance between the satellite and the GPS receiver. The internal clock of the GPS is usually affected by a large error with respect to the GPS satellite clocks. In order to resolve this error a GPS receiver must acquire at least four satellites to provide a position fix comprising the three space coordinates x, y, z and time t.

The phase in which the GPS receiver endeavors to localize a sufficient number of satellite signals in the phase offset—Doppler shift space with little or no knowledge of their position is usually named the "acquisition" phase. Once the peaks are found, on the other hand, in the "tracking" phase, the system has only to follow their drift, which is usually done with less difficulty or delay.

In order to speed up the acquisition phase, many receivers adopt a massively parallel architecture, in which the correlation engine of the receiver comprises a large number of correlators, in order to explore several combinations of time shift and Doppler frequency in parallel. In typical cases, a correlation engine is able to perform correlation of the incoming signal with thousands time-shift/Doppler frequency combinations.

A limitation of this approach is that the massive parallelization requires a large amount of memory, which contributes heavily both to the size of the resulting circuit, for example in terms of silicon area used, and to the power consumption.

It is the same case in many modern electronic application, in which a large amount of data must be processed, that chip size and power consumption are dominated by the amount of memory used, in particular dynamic random access memory (DRAM) or other kind of volatile memories. It is therefore desirable to provide a system that reduces the size and energy consumption of such memories.

BRIEF SUMMARY OF THE INVENTION

According to the invention, these aims are achieved by means of the object of the appended claims.

The invention will be better understood with the aid of the description of an embodiment given by way of example and illustrated by the figures, in which.

Figure 4:
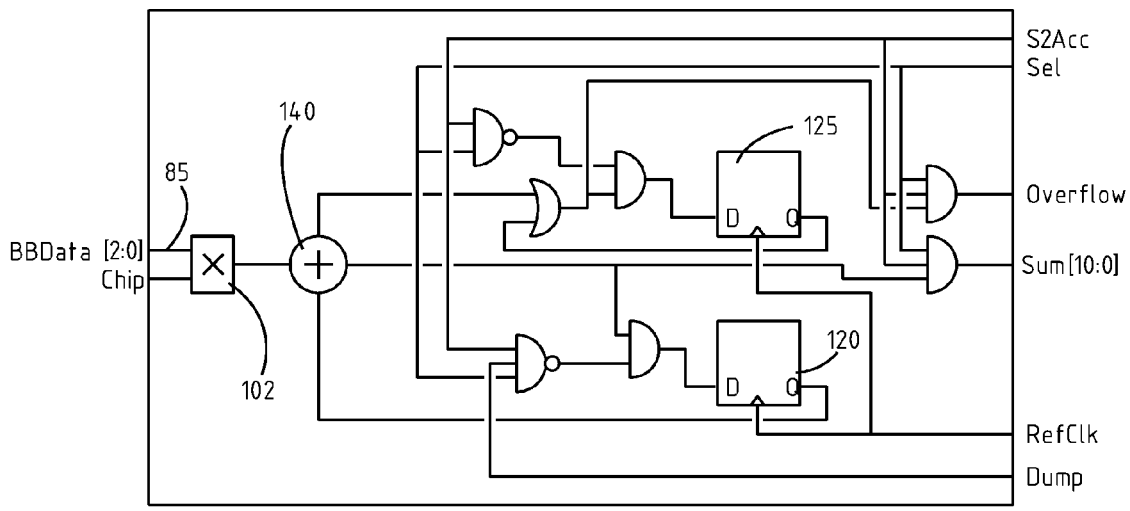
Figure 5:
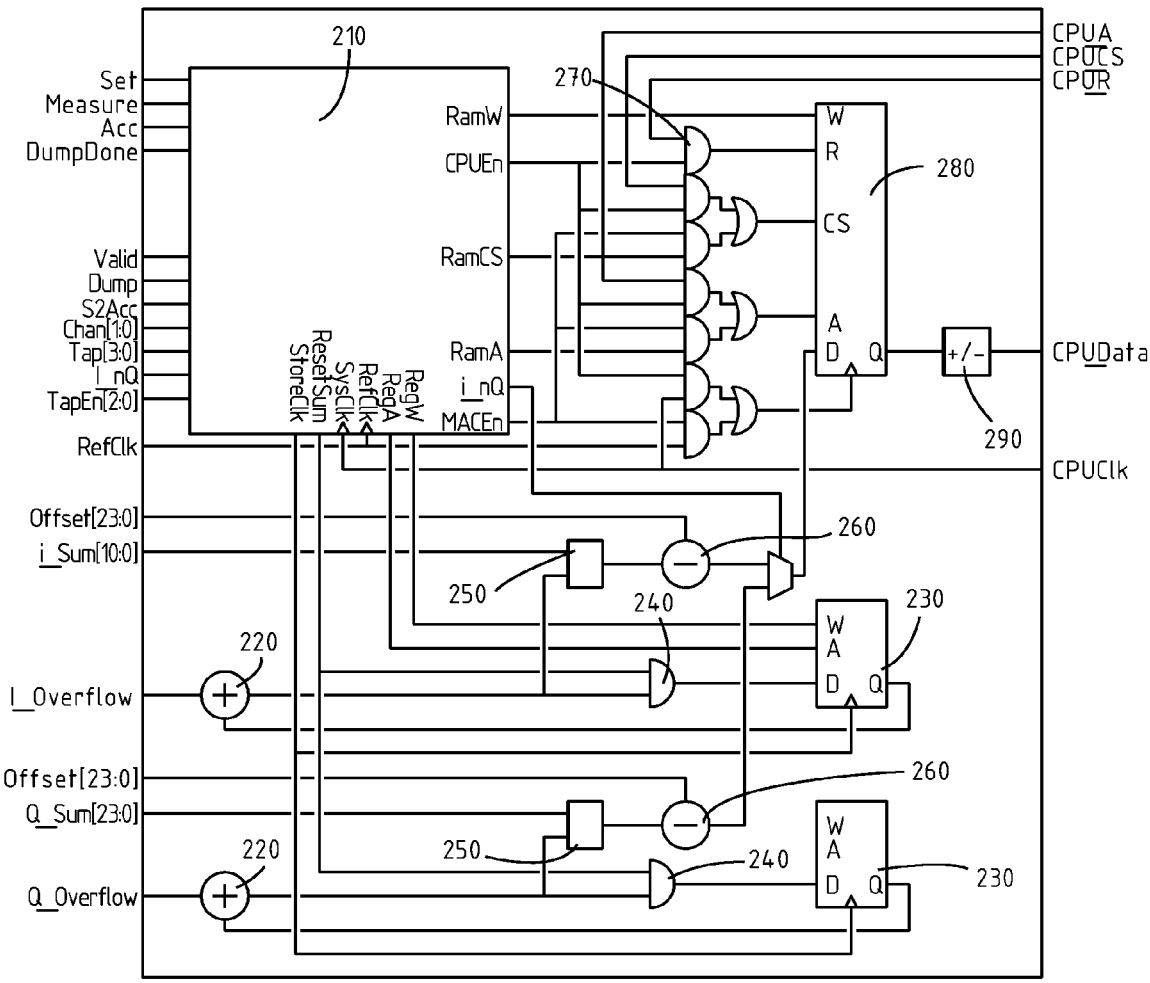

FIGS. 4 and 5 respectively show a first and a second correlation and accumulation stage according to one aspect of the present invention.

Figure 6:
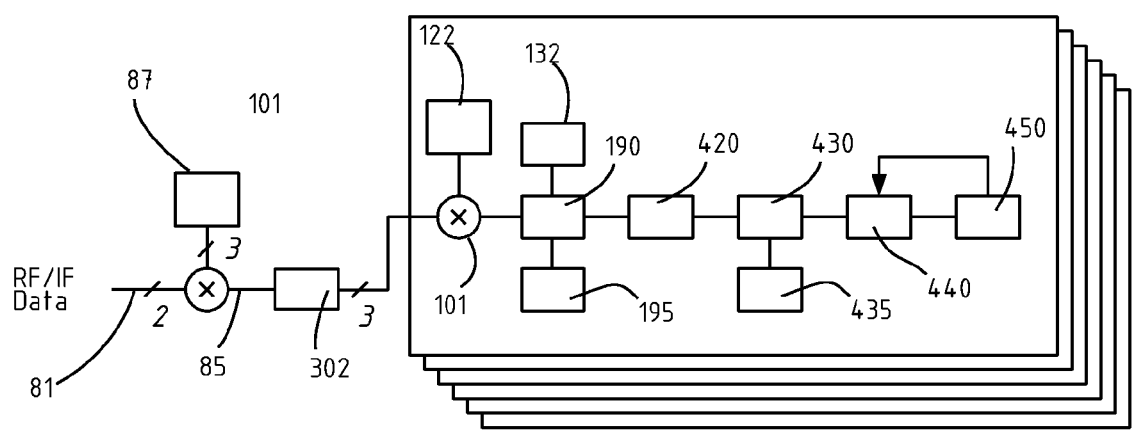

FIG. 6 represents a further aspect of the correlator according to the invention.

DETAILED DESCRIPTION OF POSSIBLE EMBODIMENTS OF THE INVENTION

Figure 1:
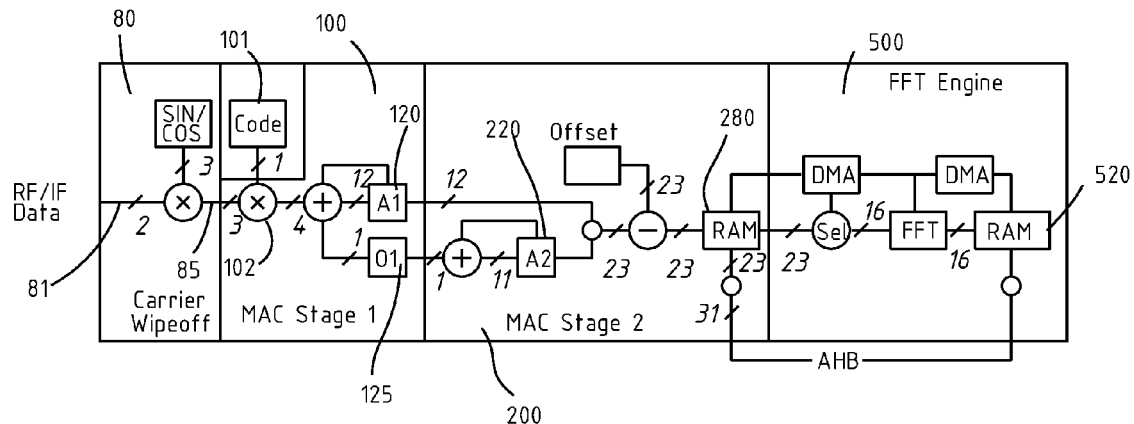
FIGS. 1 and 3 Show schematically the architecture of a correlation engine according to one aspect of the present invention.

FIG. 1 represents schematically a simplified data pipeline in a digital receiving channel, or tap, of a radiolocalization receiver according to some aspects of the present invention. Italic numbers, in FIG. 1, indicate bit width of the data lines they refer to. Such data widths are given here by way of example only, in order to assist understanding, and do not limit the invention in any way.

The receiver 50 comprise preferably a carrier wipeoff section 80, which shall be describer later in further detail, whose task is to remove a carrier signal from the digital RF or IF data 81, for example a digital IF (Intermediate Frequency) signal provided from a RF section (not represented) of the receiver. The carrier wipeoff section comprises a local carrier generator 82, for example a NCO, which is arranged to generate a replica carrier signal equal to the carrier of the RF or IF Data, including carrier Doppler, which is mixed with the input RF data to produce a carrier-stripped digital signal 85, having, for example, three bits. Even if not immediately apparent from FIG. 1, the carrier wipeoff section 80 produces both an in-phase (I) and a quadraphase (Q) digital signal 85, by mixing two quadrature-shifted (SIN/COS) copies of the local carrier with the RF/IF data.

In the represented example, the carrier NCO provides a 2 bit sine/cosine output with values mapped in a three-bit representation as in the following table 2. Other representation are however possible and included in the scope of the present invention.

TABLE 1

| | SIN/COS mapping | | | | | | | |
|---|---|---|---|---|---|---|---|---|
| Phase | 0 | 45 | 90 | 135 | 180 | 225 | 270 | 315 |
| COS | 2 | 2 | 1 | −1 | −2 | −2 | −1 | 1 |
| SIN | −1 | 1 | 2 | 2 | 1 | −1 | −2 | −2 |

The RF or IF data 81 have 2 bits sign/magnitude interpreted according to the following table 3.

TABLE 2

| IF Input mapping | | |
|---|---|---|
| IF Value | Sign | Magnitude |
| 3 | 0 | 0 |
| 1 | 0 | 1 |
| −1 | 1 | 0 |
| −3 | 1 | 1 |

The carrier-stripped data 85 resulting of the multiplication is mapped into 3 data bits as shown to reduce logic in later stages.

TABLE 3

| dot product mapping | |
|---|---|
| Value | Representation |
| −6 | 0 |
| −3 | 1 |
| −2 | 2 |
| −1 | 3 |
| 1 | 4 |
| 2 | 5 |
| 3 | 6 |
| 6 | 7 |

The digital signal 85 is still mixed with all of the in-view satellite signals. The local code generator 101 is arranged to generate a local replica of the PRN code of one specific satellite, in order to obtain a baseband code-stripped signal for that satellite. The replica PRN code has for example a single bit per tap, representing −1(0) and +1(1). As it will be seen later the multiplier 102 biases the results so they are positive. This simplifies the rest of the accumulator and reduces the power consumption.

To reduce the resources required for implementing the large number of correlator taps the MAC (multiply/Accumulate) is partitioned into 2 stages, the first stage 100, or MAC stage 1, operates preferably on all taps simultaneously within a single clock cycle producing a partial result which is always positive.

According to one aspect of the invention, the digital data that are to be accumulated in the correlation engine are biased so that they are always positive integers, or at least non-negative integers. This can be obtained, for example, by adapting the multiplier stage 102. In the represented example, the code value can be either 0 or 1, while the value of carrier-stripped data 85 can be ±1, ±2, ±3, or ±6. Table 4 below indicates the effect of multiplying the code and adding a bias.

TABLE 5 code dot product offset mapping

| Code value | Data value | Data representation | Result | Biased result |
|---|---|---|---|---|
| 0 | −6 | 0 | 6 | 14 |
| 0 | −3 | 1 | 3 | 11 |
| 0 | −2 | 2 | 2 | 10 |
| 0 | −1 | 3 | 1 | 9 |
| 0 | 1 | 4 | −1 | 7 |
| 0 | 2 | 5 | −2 | 6 |
| 0 | 3 | 6 | −3 | 5 |
| 0 | 6 | 7 | −6 | 2 |
| 1 | −6 | 0 | −6 | 2 |
| 1 | −3 | 1 | −3 | 5 |
| 1 | −2 | 2 | −2 | 6 |
| 1 | −1 | 3 | −1 | 7 |
| 1 | 1 | 4 | 1 | 9 |
| 1 | 2 | 5 | 2 | 10 |
| 1 | 3 | 6 | 3 | 11 |
| 1 | 6 | 7 | 6 | 14 |

The MAC is disabled when a code slew is activated and is re-enabled after the next ACC event, this prevents erroneous correlator outputs being propagated to the CPU.

Each tap of the replica code is multiplied by the baseband signal on each cycle and accumulated into a holding register 120, 125, 220, in the MAC stages 100 and 200. These registers are sized to allow accumulation of a number of data samples without overflowing on a section of code referred to as a code segment.

The second stage 200 then accumulated, for example, the overflow from these partial accumulations into a RAM 280 for more efficient storage, this is done sequentially over a number of channels.

The signal processing unit engine 500 performs further processing on the data stored RAM 280, for example by FFT processing or other means.

Figure 2:
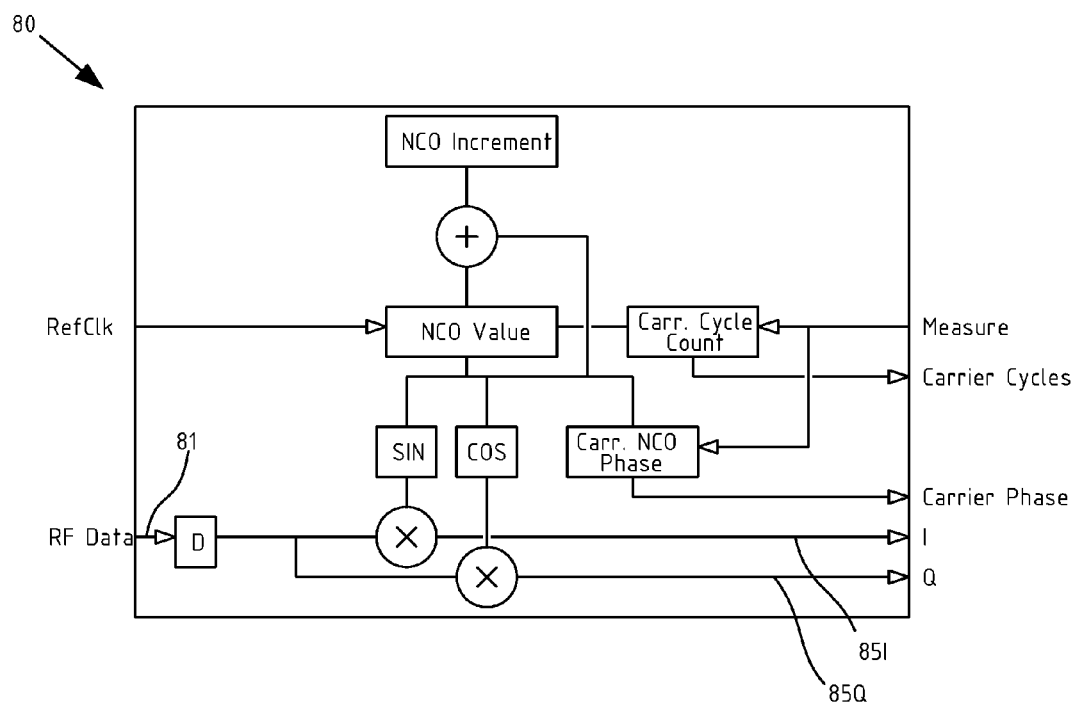
FIG. 2 shows a carrier wipeoff section of a receiver according to the present invention.

FIG. 2 represents in further detail the structure of the carrier wipeoff section 80. According to this figure RefClck is a Reference clock signal, Measure is an input signal indicating that a measure is performed, CarrierCycle and CarrierPhase are digital signals which are available to other stages of the receiver, for various purposes. 85I and 85Q indicate the in-phase and quadraphase output digital signals.

Figure 3:
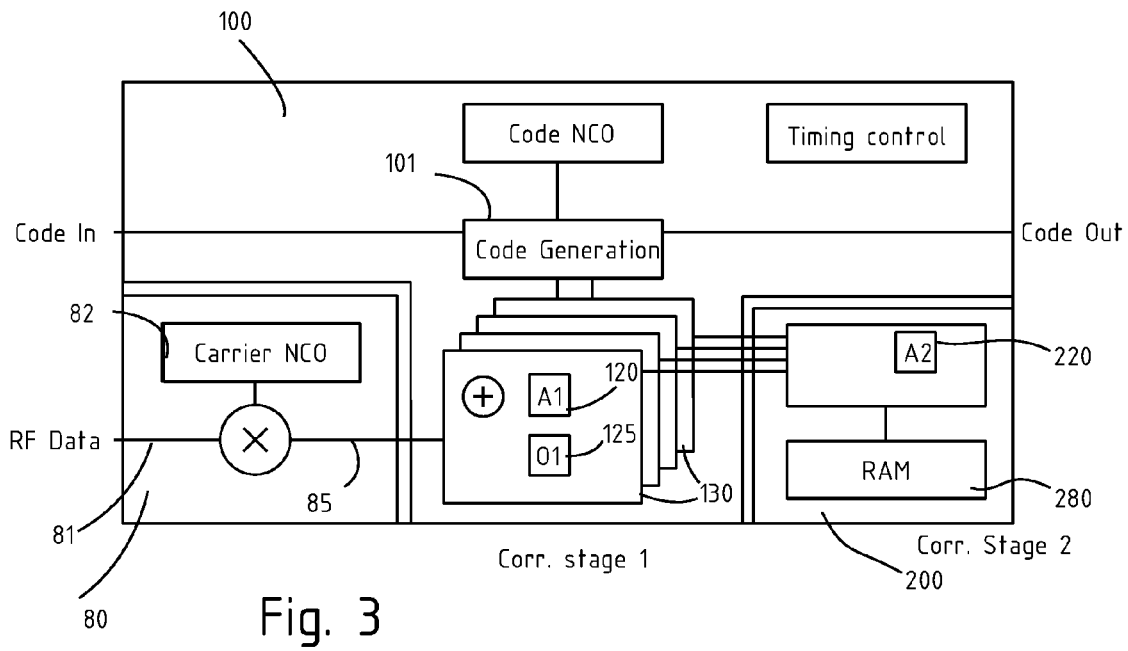

FIG. 3 represents the architecture of the correlation engine section in further detail. The carrier-stripped signal 85, is correlated with the codes generated by code generator 101 and the code-stripped signal so obtained is accumulated in correlation stages 1 and 2. In first correlation stage 100 all taps are accumulated in parallel by a plurality of accumulation cells 130. For example the stage 1 accumulator is duplicated 32 times with the appropriate I/Q data and code phases routed accordingly.

FIG. 4 shows a possible realization of an accumulation cell 130 according to one aspect of the invention. Incoming data 85 is multiplied in the multiplier 102 by the gold code (Chip) generated by the code generator 101 (see FIG. 1) and the resulting code-stripped is encoded or biased to give a positive value on each cycle, for example according to table 4. The biasing circuit is not represented for sake of simplicity. According to the invention it can be a separate circuit from multiplier 102, or integrated in the multiplier 120. The biased result is added by adder 140 to the value stored in the holding register (4) and any overflow is used to set the overflow register 125. Even if FIG. 4 shows a one-bit register 120 for simplicity, the capacity of the holding register 120 may be chosen according to the circumstances. For example the holding register 120 may be a 12-bit register. In this case the adder 140 would be a 12-bit full adder, and the overflow register 125 a simple register, to store the carry bit of the adder 140.

Importantly, the encoding used is such that it can be readily reversed. This is trivial in the case of a fixed biasing, that can be simply subtracted from the accumulated data, when needed. Other encodings are however possible within the invention.

When the second correlation section 200 is reading a value by asserting Sel and S2Acc the overflow flag is reset, but the accumulated value is not reset.

When a dump cycle is occurring, Dump is activated at the same time, and this causes the accumulated value to also be reset, at this time the value that was in it is transferred to the output memory by the second correlation stage 200.

According to a possible embodiment of the invention the second stage of correlation 200 shown in FIG. 5, is performed using a register file 230 and state machine 210 where the register file 230 is shared between multiple taps and possibly multiple channels for better efficiency. This state machine 210 addresses the memory periodically to read the value corresponding to a tap then adds the overflow of the first correlation stage 100 into the second correlation stage 200.

When a dump event is triggered the storage is reset instead of accumulated and the accumulated value is output stored in any appropriate way, for example it is pushed into a FIFO together with an address corresponding to the channel being dumped.

The correlation stage 200 operates sequentially over a number of accumulators 130 belonging to one or more first correlation stage units 100. There are 3 basic operations described below.

Each operation is triggered by activation of the Stage2Start event from the Timing Control module.

In each mode the state machine performs an identical operation on each of the input channels in sequence then enters the idle state again.

For each correlator tap there are 2 channels, I and Q to be processed. The second correlation stage 200, or example, has to accumulate for up to 10 ms without rollover, using samples at up to 32 MHz, this equates to 320000 samples*11=3,520,000, this requires 22 bits of data to store the result.

Since in this example the first correlation stage 100 has 12 bits, of which the MSB, or carry bit stored in the overflow register 125 is accumulated into the register file 230 we need to accumulate 11 bits per value, this implies the use of an 11*128 register file.

Alternatively, by accessing I and Q in a single cycle one could use a 64 word register file, in this case we update at twice the rate, performing 64 taps in 16 cycles. This reduces the range required in stage 1 to 11 bits and increases correspondingly the width of the state 2 register file to 22 bits.

Periodically the master timing controller of the second correlation stage 200 activates the Acc signal to cause an accumulation of all the Mac Stage 1 result, this triggers the state machine 210 to begin an accumulate process. Data from the mac's is addresses with Chan[1:0], Tap[3:0] and I_nQ signals.

Data is accesses by assertion of the S2Acc signal, accumulated values are read from the register file 230 and added, by adders 220 to the overflow bit from the addressed accumulator 130. The results are written back to the register file.

When the timing master indicates that a dump cycle is to be performed the same sequence of events begins, with the same timing, however this time the state machine asserts the Dump indication to the stage 1, this causes each accumulator 130 in stage 1 to restart accumulation.

During a dump event the data from the registers is added to the overflow flag from the addressed tap and concatenated with the lower 11 bits from stage 1, in unit 250. The resulting unsigned value has a fixed offset and this is removed in the subtractor 260, the result is then stored into the magnitude ram 280. During the dump cycle the contents of the register file are zero'ed read for the next accumulate cycle To access the magnitude ram the state machine uses the multiplexer 270 to take control of the clock and control lines so that the memory is accessed on the RefClk domain, when not required for dump events the memory is connected to the CPU domain.

The results in the magnitude ram 280 are signed 22 bit values, so to reduce the memory overhead the result is sign extended to 32 bits by unit 290 when the CPU reads it.

The presented architecture depends on the fact that the input data 85 are biased so as to be always positive, or always non-negative. In this way, the first correlation stage 100 stores a first group of lower-order bits of the integrated correlation value that always grows monotonically, increasing, and never decreasing, during an accumulation. The second correlation stage 200 just has to accumulate, in a second group of higher-order bits of the same variable, the value of the overflow, or carry bit, of the first correlation stage 100 (a fully equivalent result could be obtained by biasing the input data with a negative bias, so they are always non-negative). The advantages of this are several:

- The overflow rate of the first correlation stage 100 is conveniently scaled down respect to the rate of the input data. Thus the second correlation stage 200 can interface several accumulators 130 or several first stages 120, accumulating only the carry output of the previous stages on each iteration, effectively realizing a multiplexing of the data in the time domain.
- Full speed parallel access is not needed in the second correlation stage 200. Register files and RAM can be used, instead of static registers, with a gain in power and silicon space.
- The adders 220 in the second correlation stage 200 can be simply implemented as half adders.
- Since the storage areas 120, in the first correlation stage 100, and 230, in the second correlation stage 200, are incremented by small positive numbers, the transition frequency of the individual bits decreases logarithmically, going from the lower to the higher bit weights. That is, most of the time, the binary values read form the memory 120 are written back in unchanged. This means that the bit-flip rate in memories 120 and 230 is very low, with a very substantial reduction of dynamic power consumption.

The last advantage is especially evident in comparison with the traditional accumulation modules, in which data are stored as signed integers, for example as 2-complement signed binary values, and incremented randomly, at each cycle, by positive or negative values. In this situation, every time the accumulation of random noise leads to a change of sign in the result, most of the bits switch at the same time, drawing a large dynamic current.

According to an aspect of the present invention, the carrier-stripped data are accumulated in a buffer memory for a number of cycles, to produce a set of samples synchronous to the expected SV code at a multiple of the expected SV code chip rate. The buffer memory is preferably dimensioned to hold a number of samples corresponding to one code period (one millisecond in the case of GPS) or slightly more. A replica code for the desired SV is likewise generated and stored into a memory during the initial 1 ms of the SV search process.

Periodically the correlation process is performed for a number of taps and these tap outputs are passed in small groups to a DFT engine which performs a DFT process across a number of lines to expand the Doppler search window.

After a number of coherent integrations by the DFT process the magnitude of each of the DFT results is incoherently accumulated into the output memory.

To reduce the output memory size separate address generators can be employed for source and output data, and input taps can be selectively enabled, either individually or in groups, this allows for the output memory size to be less that the total available taps.

When an input tap is not required the source address is incremented but the destination address is held, thus compressing the output data into a smaller address space and reducing both power dissipation and memory requirements.

Since the GPS gold codes have a repetition rate of 1 ms it is clear that all data locations in the DFT memory are accessed at least once per ms, this can give an advantage by allowing dynamic memory cells to be used. Since these cells have a limited data retention duration they usually require refreshing periodically by a refresh controller, which guarantees that each cell is refreshed within a specified time (typically 64 ms), much shorter than the average retention time of a volatile dynamic memory cell.

The refresh controller adds both to power dissipation and silicon area, however since new data is written to each location every ms, which is lower than a typical data retention time, the refresh process can be avoided and the refresh controller omitted, this reduces the power dissipation and silicon area, because all the DRAM refresh circuitry can be entirely disposed of. DRAM could also be replaced by unrefreshed volatile memory of different technology.

Conventionally DRAM is embedded in an ASIC circuit in the form of library circuit blocks, which come with their refresh circuitry. The size of the refresh circuitry, however, does not scale down with memory size. As a result, the refresh circuit is a substantial overhead in term of power consumption and use of silicon, in particular with small DRAM compared to SRAM of equivalent capacity.

For this reason, and also to avoid IP purchase costs, many embedded architecture do not use DRAM, unless a fairly large storage capacity is necessary.

By removing the refresh circuitry, DRAM became competitive with SRAM even at small and medium sizes. The problem of contention and timing is avoided entirely, because the DRAM has no refresh cycles, therefore its time availability is maximal. With reference to FIG. 1, memories 220 and 280 could be implemented by un-refreshed volatile memories, that is a volatile dynamic memory lacking a refresh circuitry.

Internally-refreshed DRAM is usually designed to provide an extremely high reliability and an exceedingly low error rate, for example one bit error per gigabyte per month of continuous operation. This is obtained by a strict automatic refresh policy. In some applications, however, such reliability may not be necessary. When the stored data are noise-dominated, in particular, much higher error rates can be tolerated. Some aspects of the present invention take advantage from this realization.

Unlike true static memory devices, volatile memories typically work by storing a charge on a capacitive element, and reading from the location destroys the contents requiring a hidden write cycle to restore the contents that were just read, however in the DFT processor and the accumulator each location is used for temporary storage of a value being accumulated and the read is followed immediately by a write of a new value to the same location, consequently the architecture can tolerate destructive reads, or effectively a read once cell, this allows the hidden writeback to be removed further reducing the power requirements.

According to a preferred variant of the invention, the DFT processor reads and writes only a part of the available memory, according to the need. During the initial acquisition phases, while a large number of potential peak candidates have to be analyzed in parallel, the system uses all the available memory. Each memory location is read and written at least once per millisecond; therefore its value is safely retained.

In later stages or acquisition, when the acquisition problem is simple, the search space already quite restricted, or in tracking, the DFT processor only has to consider a reduced number of taps. The DFT processor will use only a part of the available memory, reading and writing the memory cells contained therein, and ignore the remainder of the memory. In this case the content of the unused part of the memory is simply allowed to decay to a meaningless state, and does not consume power. This is not a limitation in many real-time applications, like the presented case of the DFT out memory. In these applications if a memory position is not updated regularly (every millisecond in the presented case), its value is in any case useless, and is not worth refreshing. The system self-manages its energy consumption according to the quantity of memory used.

In the preferred implementation the architecture consists of a number of such engines configured to behave as pre-acquisition engines and confirmation engines.

In the pre-acquisition engine, or skimmer, a search across a large code and Doppler space is performed in parallel. All taps are required and a preferred tap spacing of ½ chip is selected. The output and input are synchronized so a single address generator can be employed, and no tap enable is required.

The confirmation engine, or distiller, performs a more in depth correlation on the taps of interest for verification of candidate signals. In the confirmation engines the preferred implementation is to use ¼ chip tap spacing and to limit the number of output locations to 1024 samples, thus the confirmation engines utilize a map to selectively enable the taps and includes separate input and output address generators.

In the preferred implementation, this is made possible by the technique of accumulating input data in an input buffer samples synchronously to the Code NCO and storing these accumulated samples which are aligned to the Code Chip boundaries (though they may be partial chips in size ), accumulating these samples synchronous to the code NCO allows us to reduce the input storage overhead since by aligning the samples with the code we can then reduce the number of samples we need to store and also we can scale the accumulated samples to reduce the precision with which they are stored.

Additionally, since the samples are code aligned we reduce the data rate into the main correlator and save further power. Note that the samples may also be biased, as described above so we do not constrain the representation of the samples to being 2's complement.

Other variant architectures store the input samples for post processing and perform the alignment and accumulation at correlation time, but this feeds more data to the correlator and requires more storage and more complex sample alignment.

Accumulated data in the input buffer are typically small integer values, with 3 or 4 bit depth. The input data buffer is dominated by stochastic noise, and only the statistical processing performed by the skimmer and the distiller allows the extraction of a useful signal. Consequently, random data errors in the individual samples of the input buffer would be equivalent to an additional noise source and, if it is limited to a reasonable amount, say less than some percent, would have no consequence on the successive statistical result of the correlation process.

The signal processor of the present invention is therefore tolerant to a data error of some percent in the input buffer. This contrasts with traditional digital design requirements, where data error rates must be very much lower. This requirement contributes to the determination of the operating voltage of the volatile dynamic memory, hence to its power consumption.

The circuit of the invention should preferably address the un-refreshed volatile memory of the input buffer at a rate which is substantially shorter than the mean data retention time. It is not needed, however, that the mean time between data error should be reduced to a negligible quantity. The rate at which the circuit of the invention addresses the un-refreshed volatile memory can therefore be quite longer than the 64 ms which are usually requested in DRAMS. In alternative, the operating voltage of the unrefreshed DRAM could be lowered, reducing power consumption.

This allows also for techniques involving frequency domain processing of the input samples using for example an FFT, where the process may take many mS to complete, but where the data is accessed frequently enough to ensure that explicit refresh cycles are not required, using just the hidden writeback to preserve the data contents.

In further detail, and with reference to FIG. 6, the processor of the invention comprises a carrier wipeoff section, including the local carrier NCO 87, and a correlator, to produce a carrier-stripped digital signal 85 as described above. Sample buffer 302 is used to store a convenient length of the carrier-stripped signal, in real time. Typically sample buffer 302 stores one millisecond of data, which are periodically overwritten at one millisecond repetition rate. Other repetition rates are however possible.

Sample buffer 302 is realized by an unrefreshed dynamic memory, for example an unrefreshed DRAM. Since data are constantly overwritten at a rate substantially faster than the mean retention time of the DRAM, the error rate in sample buffer 302 can be made negligible. A small error rate (possibly up to some percent), may be acceptable, because data stored in sample buffer 302 are small noise-dominated numbers and a few errors would not affect the result.

Optionally, retention errors in sample buffer 302 may be corrected by known ECC techniques, at the expense of a small increase in memory size. This is however less penalizing, in terms of power consumption and memory size, than an automatic refresh circuitry.

Further on in the processing chain of FIG. 6, the carrier-stripped samples of sample memory 302 are passed to one or more correlation and processing units, comprising a code NCO 122, a further correlator 101, a local code generator 132, and a correlation unit 190, providing partial correlation results, which are stored in partial result memory 195. This part of the processor could be realized, for example similarly to MAC correlation stages of FIG. 1. Other architectures are however possible.

Partial result memory 195 is realized by an unrefreshed dynamic memory, for example an unrefreshed DRAM. Since data are constantly overwritten at a rate substantially faster than the mean retention time of the DRAM, the error rate in memory 195 can be made negligible. Optionally, known ECC techniques can be used to further reduce error likelihood, as seen above.

Result ROM 420 is used to store the result of the previous correlation unit, and is accessed by DFT processor 430, which analyze those date and generate coherent correlation results corresponding to the desired combination of Doppler and code shift. These coherent correlation data are stored in real time in the coherent data memory 435 and are constantly updated and overwritten at a rate of one millisecond, for example.

Coherent data memory 435 is realized by an unrefreshed dynamic memory, for example an unrefreshed DRAM. Since data are constantly overwritten at a rate substantially faster than the mean retention time of the DRAM, the error rate in memory 195 can be made negligible. Optionally, known ECC techniques can be used to further reduce error likelihood, as seen above.

Magnitude processor 440 is used to calculate signal magnitude data, for example by incoherent integration, which are stored in output memory 450, accessible by the host CPU, or by other part of the signal processor, according to the need.

The invention claimed is:

1. A signal processor for a GNSS receiver, comprising:
a volatile dynamic memory configured as a non-refresh storage element for real-time digital data;
wherein the volatile dynamic memory comprises a non-refresh dynamic memory buffer to store real-time digital data, wherein the real-time digital data is received from a radiolocalization system at a rate faster than a retention time of the volatile dynamic memory;
and wherein the processor is configured, when buffering the received real-time digital data is required, to address periodically cells of the non-refresh dynamic memory buffer with a repetition period shorter than the retention time of the volatile dynamic memory.

2. The signal processor according to claim 1, wherein the volatile dynamic memory lacks a refresh circuit.

3. The signal processor according to claim 1, further comprising an IF signal input and a correlator unit, arranged to correlate a stream of digital signals present at the IF signal input with a locally provided code of the radiolocalization system, the non-refresh dynamic memory buffer being located between the IF signal input and the correlator unit.

4. The signal processor according to claim 3, wherein the repetition period is essentially equal to a period of the locally provided code and substantially shorter than the retention time of the volatile dynamic memory.

5. The signal processor according to claim 1, wherein the repetition period is equal to a repetition rate of a GNSS pseudorandom noise PRN code.

6. The signal processor according to claim 1, further comprising a discrete Fourier transform (DFT) processor, wherein temporary data storage of the DFT processor comprises the non-refresh dynamic memory buffer.

7. The signal processor according to claim 6, wherein a read of any location in the temporary data storage is destructive.

8. The signal processor according to claim 1, wherein an operating voltage of the non-refresh volatile dynamic memory is such that the retention time of the volatile dynamic memory is substantially longer than the repetition period.

9. The signal processor according to claim 1, wherein the non-refresh dynamic memory buffer is configured to operate at an operating voltage based on the repetition period.

10. The signal processor according to claim 1, wherein the processor is further configured to use hidden writebacks to preserve a data content of the non-refresh dynamic memory buffer.

11. A signal processor for a GNSS receiver, comprising:
a volatile dynamic memory configured as a non-refresh storage element for storing real-time digital data, wherein the real-time digital data is received at a rate faster than a retention time of the volatile dynamic memory;
and wherein the processor is configured, when buffering the received real-time digital data is required, to write periodically to cells of the volatile dynamic memory with a repetition period substantially shorter than the retention time of the volatile dynamic memory.

12. A method of manufacturing a GNSS receiver, comprising:
providing a non-refresh dynamic memory and a digital signal processor;
configuring the non-refresh dynamic memory to store real-time digital data, wherein the real-time digital data is received from a radiolocalization system at a rate faster than a retention time of the non-refresh dynamic memory; and
configuring the digital signal processor, when buffering the received real-time digital data is required, to address periodically the non-refresh dynamic memory with a repetition period shorter than the retention time of the non-refresh dynamic memory.

13. The method according to the claim 12, wherein the step of configuring the digital signal processor further comprises configuring the digital signal processor to write, when buffering the received real-time digital data is required, periodically to the non-refresh dynamic memory with a repetition period substantially shorter than the retention time of the non-refresh dynamic memory.

14. A method of providing a signal processor for a GNSS receiver, comprising:
identifying memory resources which are used to store real-time digital data received from a radiolocalization system;
configuring the GNSS receiver such that at least some of the memory resources which are used to store the received real-time digital data are read at least at a read rate; and
implementing at least part of the memory resources which are read at the read rate with dynamic memory lacking a refresh circuitry, wherein a period of the read rate is shorter than a retention time of the dynamic memory, and wherein the real-time digital data is received from the radiolocalization system at a rate faster than the retention time of the dynamic memory.

15. The method according to claim 14, wherein the dynamic memory comprises a plurality of locations; and wherein a retention time of each location of the dynamic memory is substantially longer than the period of the read rate.

* * * * *